UNITED STATES PATENT OFFICE.

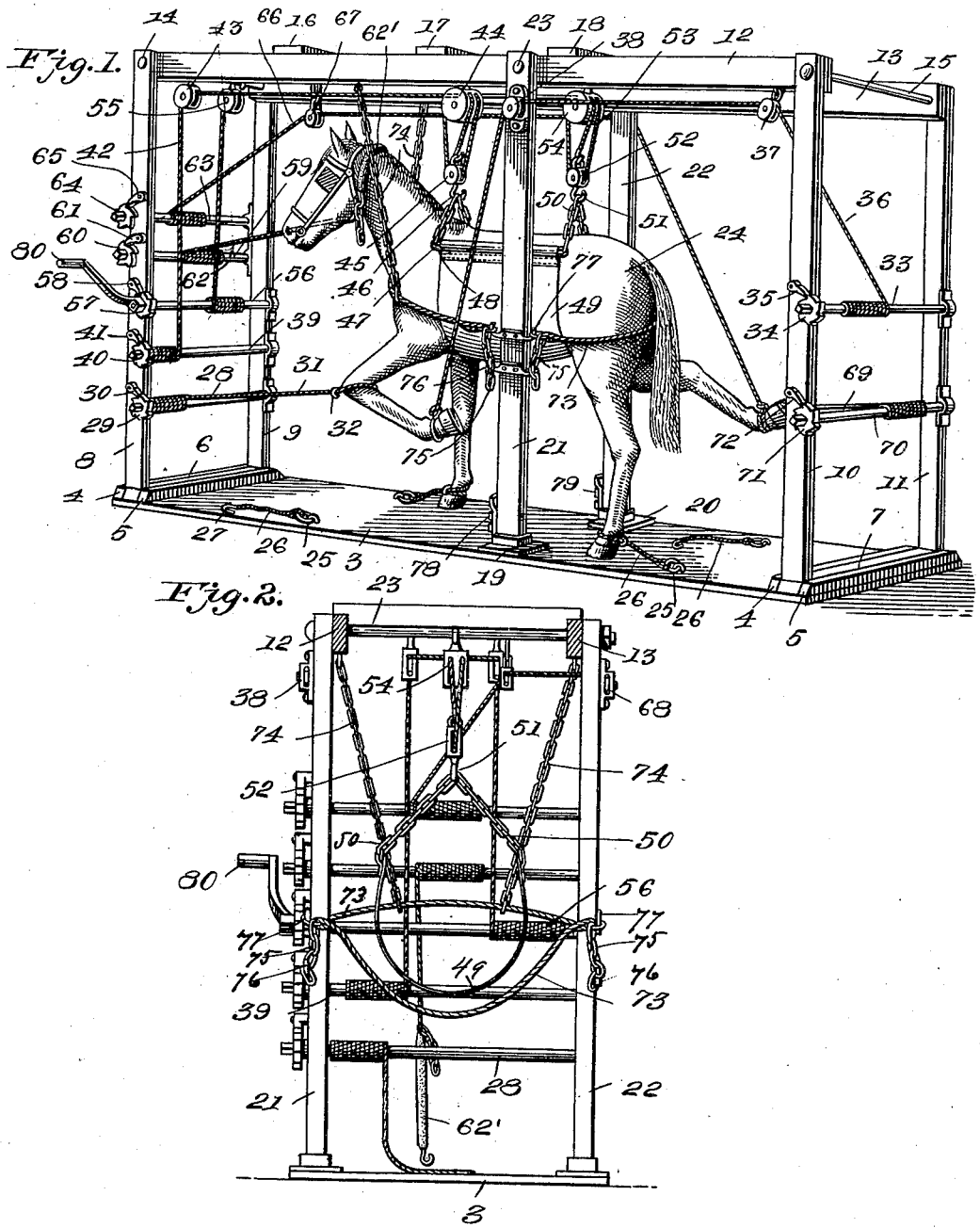

JOHN CEA, OF GRUNDY CENTER, IOWA.

HORSESHOEING-RACK.

SPECIFICATION forming part of Letters Patent No. 668,487, dated February 19, 1901.

Application filed July 29, 1899. Serial No. 725,528. (No model.)

*To all whom it may concern:*

Be it known that I, JOHN CEA, a citizen of the United States, residing at Grundy Center, in the county of Grundy and State of Iowa, have invented a new and useful Horseshoeing-Rack, of which the following is a specification.

My invention is in the nature of a rack adapted to be taken down and set up readily and easily and supplied with an improved harness adapted to be applied to a horse while being shod.

The object of my invention is to provide an improved mechanism of this character whereby all parts of the animal may be securely held in any desired position, relieving the animal of all strain, the mechanism being adjustable to suit different sizes of animals and so constructed as to be easy and safe.

With this object in view my invention consists in the improved construction, arrangement, and combination of parts hereinafter fully described, and afterward specifically pointed out in the appended claim.

In order to enable others skilled in the art to which my invention most nearly appertains to make and use the same, I will now proceed to describe its construction and operation, reference being had to the accompanying drawings, forming part hereof, in which—

Figure 1 is a perspective view illustrating the practical operation of my invention. Fig. 2 is a vertical sectional view through the rack and harness on a plane cutting transversely through the rack in the rear of the middle upright looking toward the front.

Like numerals of reference mark the same part in both figures of the drawings.

Referring to the drawings by numerals, 3 indicates the base or floor of the rack; 4 5, cleats at the ends thereof; 6 7, cross-bars between the cleats; 8 9 10 11, corner-uprights secured to the cross-bars; 12 13, longitudinal top bars; 14 15, transverse bolts through bars 12 13 and the corner-uprights; 16 17 18, top cross-bars; 19 20, sockets on the base; 21 22, middle uprights in the sockets, and 23 a bolt pivotally connecting the middle uprights to and passing through the longitudinal top bars.

The foregoing structure constitutes the frame upon which all of the harness and its operating means are supported, the horse represented at 24 standing upon the base within the uprights.

25 indicates rings secured to the base, of which there are four, in position with relation to the feet of the horse to receive ropes 26 with hook 27, whereby they may be looped around the ankle, as indicated on the left rear ankle in Fig. 1.

28 indicates a windlass journaled in uprights 8 and 9 and provided with a ratchet-wheel 29, engaged by a pawl 30, pivoted to upright 8. A rope 31 leads from the windlass 28 and is provided with a hook 32, whereby it may be looped around the left front knee to draw it forward.

33 indicates a windlass journaled in uprights 10 and 11 and provided with a ratchet-wheel 34, engaged by a pawl 35. A rope 36 leads from windlass 33 around pulleys 37 and 38 and is provided with an end hook to adapt it to be looped around the left fore ankle to raise the foot while the knee is held forward, as before described.

39 indicates a windlass journaled in uprights 8 and 9 and provided with a ratchet-wheel 40, engaged by a pawl 41. A rope 42 leads from windlass 39 through a single-pulley block 43 and double-pulley block 44, carrying a pulley-block 45, having a hook 46 to engage the end links of chains 47, secured to the front ends of bars 48 of a swing or hammock 49, adapted to fit around and support the body of the horse. The opposite ends of bars 48 carry chains 50, engaged in hook 51 of pulley-block 52, carried by rope 53, passing through double-pulley block 54 and single-pulley block 55 to a windlass 56, journaled in uprights 8 and 9 and provided with ratchet-wheel 57, engaged by pawl 58. By this means the whole weight of the horse may be supported, leaving his legs and feet free from all strain.

59 indicates a windlass journaled in uprights 8 and 9 and provided with a ratchet-wheel 60, engaged by a pawl 61. A rope 62 leads from windlass 59 to a padded collar 62', adapted to embrace the neck of the horse.

63 indicates a windlass journaled in uprights 8 and 9 and provided with a ratchet-wheel 64, engaged by a pawl 65. A rope 66 leads from windlass 63 over pulleys 67 and 68 to the right hind ankle, so as to draw it forward and upward, while a rearward pull is exerted upon it by a rope 69, leading to a windlass 70, journaled in uprights 10 and 11 and provided with a ratchet-wheel 71, engaged by a pawl 72. Two ropes 73 extend transversely and longitudinally around the body of the horse, and one of them is upheld by chains 74, depending from longitudinal top bars 12 and 13, and both of them are connected to the middle uprights by means of chains 75, engaging hooks 76 or 77, secured to said uprights. The hooks 76 and 77 extend transversely of the uprights, with a hook at each end, and are arranged one above the other, and each end of each rope is provided with a series of links by means of which it can be adjustably and detachably secured to either one of the hooks, so as to adjust the ropes to the height and size of different animals. This construction also permits of the ropes being detached from either upright, thereby permitting the animal being led into the machine from either side. The chains 50 are also each detachable from the hook 51, which will permit of the hammock or sling being passed under the animal from either side. The middle uprights are secured in sockets 19 and 20 by bolts 78 and 79.

The harness described is applied to the left fore foot and right hind foot and will be shifted to the right fore foot and left hind foot after the first-named feet have been shod, the base-chains being also shifted in the same manner.

Any of the windlasses may be turned by a handle 80.

By means of a harness constructed as herein described all of the objects of the invention will be carried out and the horse may be easily and quickly shod with safety to the shoer and comfort to the horse.

While I have illustrated and described what I consider to be the best means now known to me for carrying out my invention, I do not wish to be understood as restricting myself to the exact forms and constructions shown, as many slight changes therein or variations therefrom might suggest themselves to the ordinary mechanic, all of which would be clearly included within the limit and scope of my invention.

Having thus fully described my invention, what I claim as new, and desire to secure by Letters Patent of the United States, is—

In a horseshoeing-machine, the combination, with a platform, of a removable frame thereon comprising end and middle posts and top bars pivotally secured thereto, two hooks secured transversely to each of the middle posts, one above the other, and each having a hook at each end, two ropes for extending transversely and longitudinally around the body of the animal, each end of each rope being provided with links for detachably and adjustably securing them to said hooks, chains secured to the forward rope and to the top of the frame, pulleys on the top bars of the frame, windlasses in the end posts, ropes from the windlasses, a portion of which passes over the pulleys, a sling at the ends of two of the ropes over the pulleys, the ends of which are each provided with means for detachably connecting it therewith, and a collar at the free end of one of said ropes, substantially as described.

JOHN CEA.

Witnesses:
R. J. WILLIAMSON,
H. A. WILLOUGHBY.